United States Patent
Thomas et al.

(10) Patent No.: US 9,728,010 B2
(45) Date of Patent: Aug. 8, 2017

(54) VIRTUAL REPRESENTATIONS OF REAL-WORLD OBJECTS

(71) Applicant: MICROSOFT TECHNOLOGY LICENSING, LLC, Redmond, WA (US)

(72) Inventors: Mike Thomas, Redmond, WA (US); Cameron G. Brown, Bellevue, WA (US); Nicholas Gervase Fajt, Seattle, WA (US); Jamie Bryant Kirschenbaum, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 193 days.

(21) Appl. No.: 14/586,504

(22) Filed: Dec. 30, 2014

(65) Prior Publication Data
US 2016/0189426 A1    Jun. 30, 2016

(51) Int. Cl.
*G09G 5/00*    (2006.01)
*G06T 19/00*   (2011.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC .................................................... G06T 19/006
See application file for complete search history.

(56) References Cited

U.S. PATENT DOCUMENTS

| 8,405,680 B1 | 3/2013 | Cardoso et al. |
| 2010/0164953 A1 | 7/2010 | Wouhaybi et al. |

(Continued)

FOREIGN PATENT DOCUMENTS

| EP | 2546806 | 1/2013 |
| WO | 0158548 A1 | 8/2001 |

OTHER PUBLICATIONS

Duncan, Greg, "Occlusion Detection and Virtual Object Manipulation with the Kinect", Published on: May 31, 2012, Available at: http://channel9.msdn.com/coding4fun/kinect/Occlusion-detection-and-virtual-object-manipulation-with-the-Kinect.

(Continued)

*Primary Examiner* — William Beutel
(74) *Attorney, Agent, or Firm* — Vierra Magen Marcus LLP

(57) ABSTRACT

Methods for generating virtual proxy objects and controlling the location of the virtual proxy objects within an augmented reality environment are described. In some embodiments, a head-mounted display device (HMD) may identify a real-world object for which to generate a virtual proxy object, generate the virtual proxy object corresponding with the real-world object, and display the virtual proxy object using the HMD such that the virtual proxy object is perceived to exist within an augmented reality environment displayed to an end user of the HMD. In some cases, image processing techniques may be applied to depth images derived from a depth camera embedded within the HMD in order to identify boundary points for the real-world object and to determine the dimensions of the virtual proxy object corresponding with the real-world object.

20 Claims, 13 Drawing Sheets

(51) Int. Cl.
  *G02B 27/01* (2006.01)
  *G06F 3/01* (2006.01)
  *G06T 19/20* (2011.01)
  *G06T 7/62* (2017.01)

(52) U.S. Cl.
  CPC .............. *G06T 7/62* (2017.01); *G06T 19/20* (2013.01); *G02B 2027/014* (2013.01); *G02B 2027/0138* (2013.01); *G02B 2027/0178* (2013.01); *G06T 2207/10004* (2013.01); *G06T 2207/10028* (2013.01); *G06T 2219/2004* (2013.01)

(56) References Cited

U.S. PATENT DOCUMENTS

| | | | |
|---|---|---|---|
| 2011/0148924 A1* | 6/2011 | Tapley | G06F 3/011 345/634 |
| 2012/0113223 A1 | 5/2012 | Hilliges et al. | |
| 2012/0162254 A1* | 6/2012 | Anderson | H04N 5/2621 345/633 |
| 2012/0249741 A1* | 10/2012 | Maciocci | G06F 3/011 348/46 |
| 2012/0327117 A1* | 12/2012 | Weller | G06T 7/0042 345/633 |
| 2013/0044128 A1* | 2/2013 | Liu | G09G 5/00 345/633 |
| 2013/0106910 A1* | 5/2013 | Sacco | G06T 19/006 345/633 |
| 2013/0108116 A1* | 5/2013 | Suzuki | G01B 11/002 382/106 |
| 2013/0141419 A1 | 6/2013 | Mount et al. | |
| 2013/0328762 A1 | 12/2013 | McCulloch et al. | |
| 2014/0210856 A1* | 7/2014 | Finn | G01C 15/002 345/633 |
| 2014/0270477 A1* | 9/2014 | Coon | G06T 19/006 382/154 |
| 2014/0282220 A1 | 9/2014 | Wantland | |
| 2014/0306993 A1 | 10/2014 | Poulos | |
| 2015/0009214 A1* | 1/2015 | Lee | G06T 7/0046 345/420 |
| 2015/0026618 A1* | 1/2015 | Stone | G06F 3/0486 715/769 |
| 2015/0070714 A1* | 3/2015 | Sadasue | G06T 19/006 358/1.2 |
| 2015/0130790 A1* | 5/2015 | Vasquez, II | G06T 19/006 345/419 |
| 2015/0154799 A1* | 6/2015 | Rios | G06T 19/006 345/633 |
| 2015/0331576 A1* | 11/2015 | Piya | G06F 3/04815 715/850 |
| 2016/0012643 A1* | 1/2016 | Kezele | G06T 19/006 345/633 |
| 2016/0071320 A1* | 3/2016 | Smith | G06T 19/006 345/633 |
| 2016/0080732 A1* | 3/2016 | Pedley | H04N 13/0425 345/8 |
| 2016/0148433 A1* | 5/2016 | Petrovskaya | G06T 19/006 345/633 |
| 2016/0180193 A1* | 6/2016 | Masters | G06K 9/6202 382/218 |

OTHER PUBLICATIONS

Tian, et al., "Real-Time Occlusion Handling in Augmented Reality Based on an Object Tracking Approach", In Proceedings of Sensors, vol. 10, No. 4, Mar. 29, 2010, 11 pages.

Nini, et al., "Virtual Object Manipulation in Collaborative Augmented Reality Environment", In IEEE International Conference on Industrial Technology, vol. 3, Dec. 8, 2004, pp. 1204-1208.

Breen, et al., "Interactive Occlusion and Automatic Object Placement for Augmented Reality", In Proceedings of Computer Graphics Forum, vol. 15, No. 3, Aug. 1996, 12 pages.

PCT International Search Report and Written Opinion of the International Searching Authority, dated Mar. 8, 2016, PCT Patent Application No. PCT/US2015/064171.

Ren, et al., "A Unified Energy Minimization Framework for Model Fitting in Depth", In Proceedings of the Computer Vision—ECCV 2012 Workshops and Demonstrations, Oct. 7, 2012, pp. 72-82.

* cited by examiner

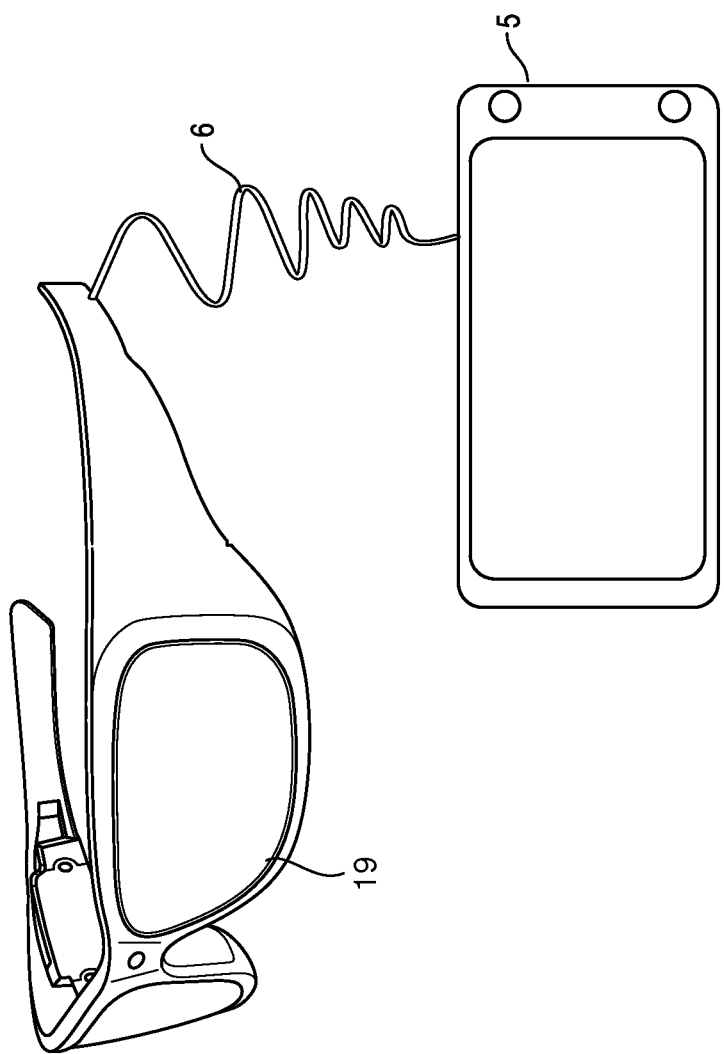

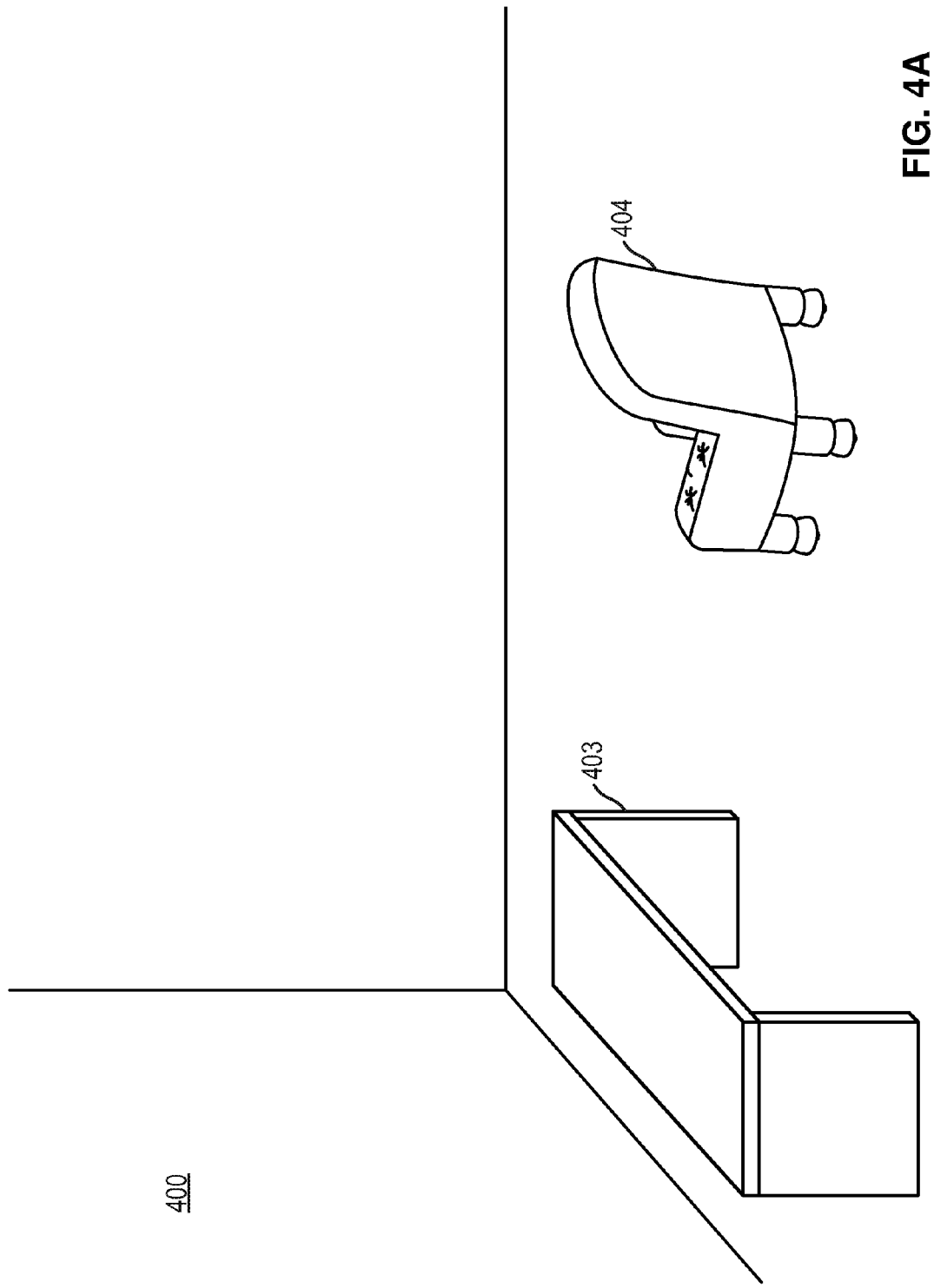

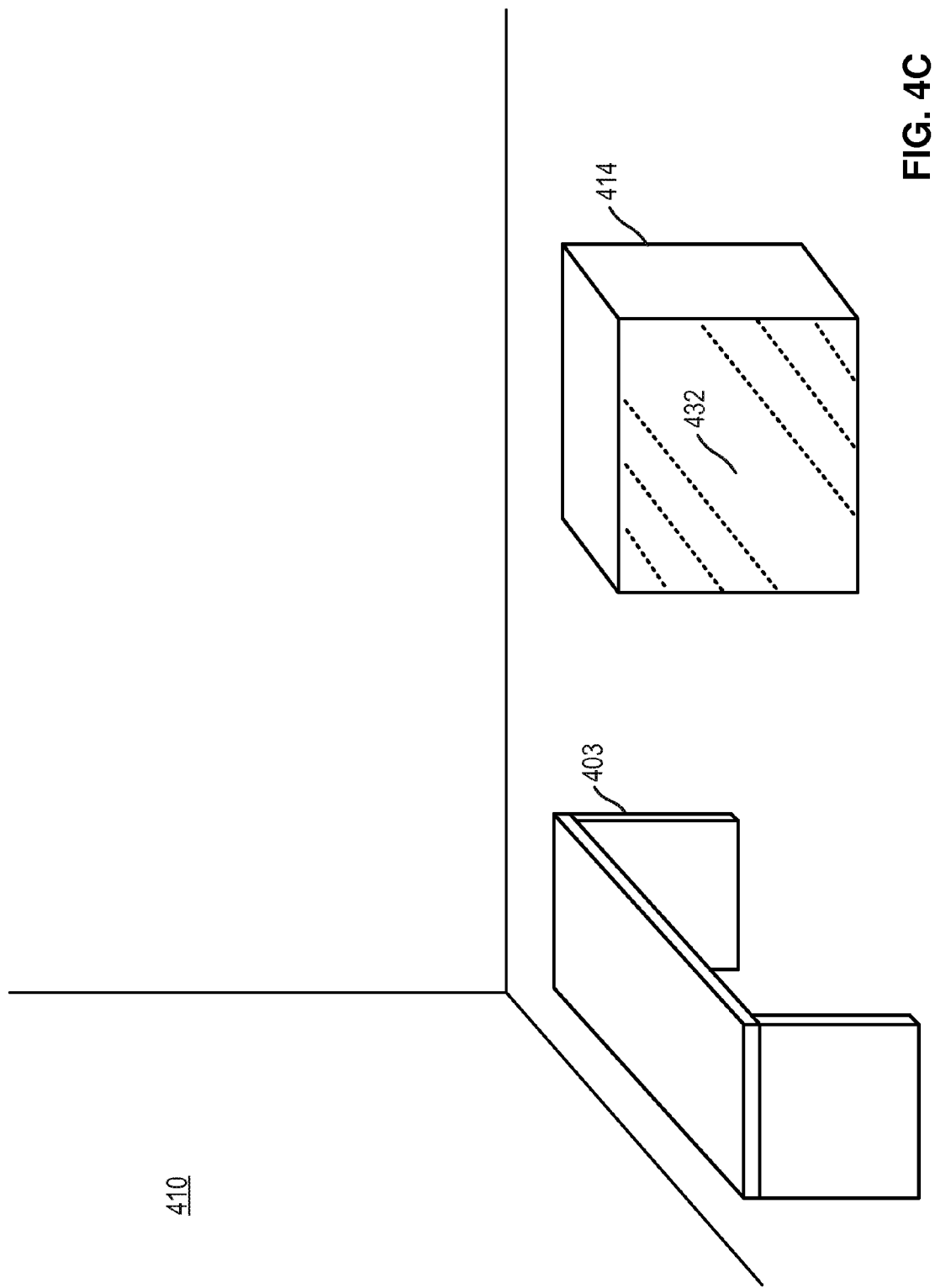

VIRTUAL REPRESENTATIONS OF REAL-WORLD OBJECTS

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system may perform several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device to be augmented as the mobile device moves within the real-world environment.

SUMMARY

Technology is described for providing an interactive augmented reality environment in which virtual proxy objects may be automatically generated and then controlled by an end user of a head-mounted display device (HMD). In some embodiments, an HMD may identify a real-world object for which to generate a virtual proxy object, generate the virtual proxy object corresponding with the real-world object, and display the virtual proxy object using the HMD such that the virtual proxy object is perceived to exist within an augmented reality environment displayed to an end user of the HMD. The location of the virtual proxy object within the augmented reality environment may be controlled by the end user using gestures or audio commands (e.g., via hand gestures or voice commands). In some cases, image processing techniques (e.g., feature detection, edge detection, segmentation, etc.) may be applied to depth images derived from a depth camera embedded within the HMD and/or color images derived from an RGB camera embedded within the HMD in order to identify boundary points for a real-world object and to determine the dimensions of a virtual proxy object corresponding with the real-world object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A depicts one embodiment of a mobile device in communication with a second mobile device.

FIG. 4A depicts one embodiment of an environment in which one or more real-world objects may be positioned.

FIG. 4C depicts one embodiment of an augmented reality environment in which a second virtual proxy object has been fitted over a chair.

DETAILED DESCRIPTION

Figure 1:
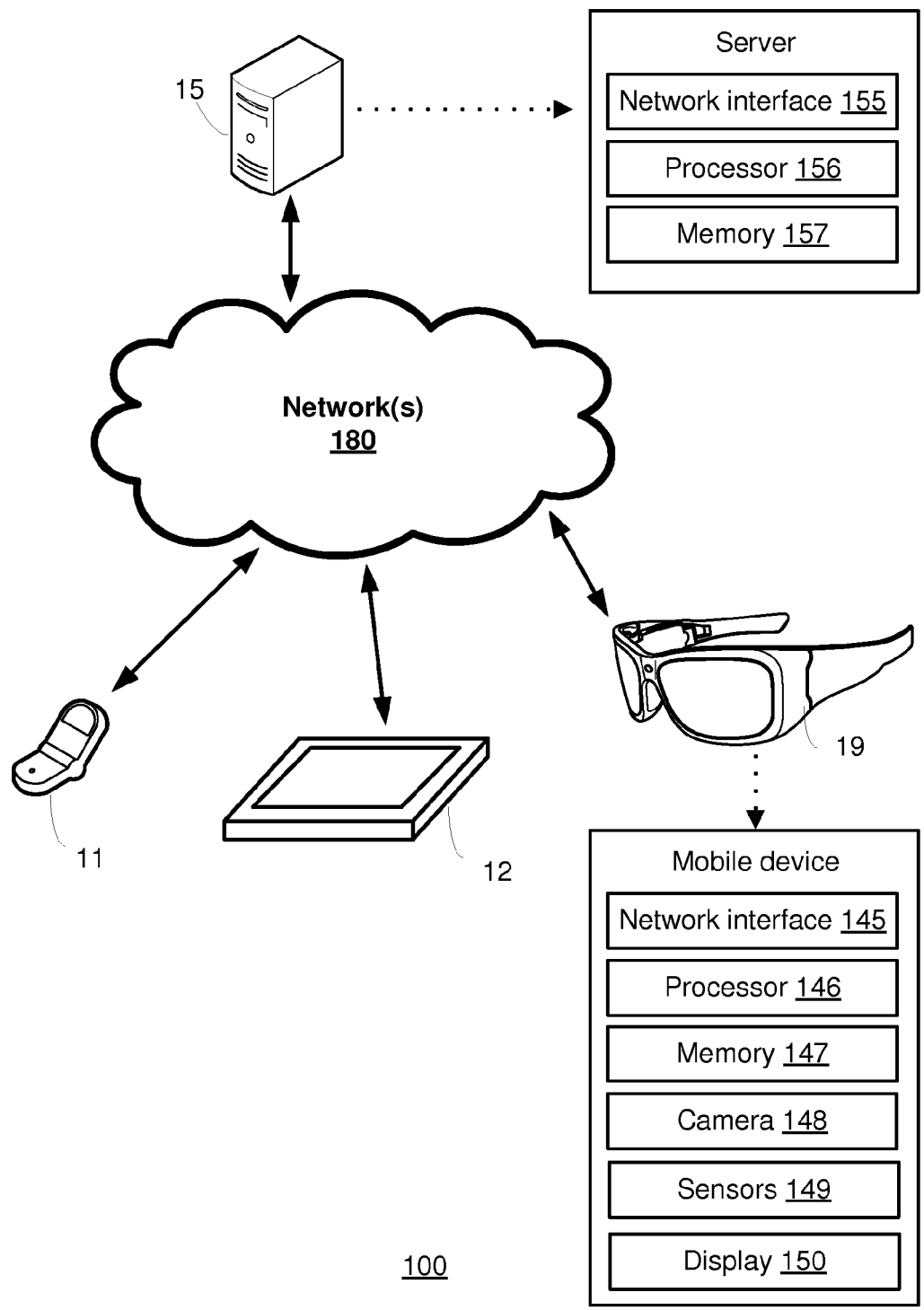
FIG. 1 is a block diagram of one embodiment of a networked computing environment in which the disclosed technology may be practiced.

Technology is described for generating virtual proxy objects and controlling the location of the virtual proxy objects within an augmented reality environment. In some embodiments, a head-mounted display device (HMD) may identify a real-world object for which to generate a virtual proxy object, generate the virtual proxy object corresponding with the real-world object, and display the virtual proxy object using the HMD such that the virtual proxy object is perceived to exist within an augmented reality environment displayed to an end user of the HMD. The location of the virtual proxy object within the augmented reality environment may be controlled by the end user via gesture-based or voice-based commands. In some cases, image processing techniques (e.g., feature detection, edge detection, segmentation, etc.) may be applied to depth images derived from a depth camera embedded within the HMD in order to identify boundary points for a real-world object and to determine the dimensions of a virtual proxy object corresponding with the real-world object. Benefits of using a virtual proxy object to represent a real-world object within an augmented reality environment include faster rendering of images displayed using an HMD, faster visualization of the real-world object within a variety of different environments, and reduced power consumption for the HMD.

In one embodiment, an end user of an HMD may select a real-world object for which a virtual proxy object is to be generated (e.g., by selecting the real-world object using a hand gesture that is captured by the HMD). In one example, the end user of the HMD may enter a furniture store and select a couch or table within a field of view of the HMD for which to generate the virtual proxy object. In this case, to generate a corresponding virtual proxy object, the HMD may identify the couch or table (e.g., using object recognition or by capturing an AR tag affixed to the couch or table), acquire a model of the couch or table including dimensions of the couch or table (e.g., by downloading the model from a server), and generate the virtual proxy object based on the dimensions of the couch or table. In another example, to generate the virtual proxy object, the HMD may determine the dimensions of the couch or table by fitting a rectangular prism onto the couch or table and then generating the virtual proxy object based on the dimensions of the rectangular prism that best fits the couch or table. The end user of the HMD may then rotate and/or position the virtual proxy object within an augmented reality environment (e.g., within a living room) in order to visualize the real-world object within the augmented reality environment.

In one embodiment, a virtual proxy object may derive from a three-dimensional proxy model of a real-world object in which the number of points and/or the number of surfaces are limited. In one example, the three-dimensional proxy model may comprise a three-dimensional shape with at most eight points and at most six surfaces. The three-dimensional proxy model may comprise a rectangular prism, a cube, a triangular prism, a square pyramid, a cylinder, a cone, or a sphere.

In some cases, the virtual proxy object may be arranged within the augmented reality environment based on a snap grid whose spacing within the augmented reality environment is based on the complexity of the virtual proxy object and/or the dimensions of the virtual proxy object. In one embodiment, the snap grid spacing may be set to be the smallest dimension (e.g., the smallest length, width, or height) of the virtual proxy object. In another embodiment, the snap grid spacing may be determined based on the number of surfaces used by the virtual proxy object and the size of the virtual proxy object. The surfaces of the virtual proxy object may be associated with one or more snapping properties, such that a particular surface of the virtual proxy object may automatically snap to a particular object within the augmented reality environment. In one embodiment, a particular surface of the virtual proxy object may automatically snap to walls (or flooring) within the augmented reality environment. In one example, a virtual proxy object for a couch may include a first surface representative of the bottom of the couch and a second surface representative of the back of the couch. In this case, the bottom of the couch may snap to the floor (or ground) and the back of the couch may snap to a wall within the augmented reality environment. In another example, the virtual proxy object for a painting may include a back surface representative of the back of the painting. In this case, the back surface may snap to a vertical wall in a room or an angled wall within a room (e.g., a wall that is angled at 45 degrees relative to a floor in the room).

A virtual proxy object may correspond with a full-sized virtual representation of a real-world object and may be rendered and displayed such that an end user of an HMD perceives the virtual proxy object to exist within the augmented reality environment as a proxy for the real-world object. The virtual proxy object may be made transparent or partially transparent such that the virtual proxy object does not occlude any real-world objects within the augmented reality environment. In some cases, the virtual proxy object may be made transparent or partially transparent whenever the virtual proxy object interacts with or overlaps with a real-world object within the augmented reality environment. In some cases, the virtual proxy object may be arrayed or arranged in a two-dimensional pattern within the augmented reality environment. For example, if the virtual proxy object corresponds with a picture frame, then an array of virtual proxy objects may be displayed to an end user of an HMD such that the array of virtual proxy objects covers a wall and each of the virtual proxy objects within the array are spaced apart by a particular amount (e.g., the virtual proxy objects may be spaced apart horizontally by one foot).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may detect that a person has performed a particular gesture in order to control the computing device.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" may be used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room or a furniture store) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user may change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side).

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that provides an augmented reality environment including a virtual content reader. The virtual content reader may comprise a virtual object within the augmented reality environment in which content may be read by an end user of the HMD. In one embodiment, the virtual content reader may comprise a virtual object that appears fixed with respect to the end user's point of view (i.e., a head-locked virtual object). For example, the virtual content reader may appear in the top left corner of the end user's point of view regardless of how the end user turns their head. In another embodiment, the virtual content reader may comprise a virtual object that appears to maintain a coherent spatial relationship within the augmented reality environment (i.e., a world-locked virtual object). For example, as the end user turns their head or moves within the augmented reality environment, the images displayed to the end user on the HMD may change such that the virtual content reader appears to exist within the augmented reality environment at a particular location (e.g., on a wall).

In some embodiments, a mobile device, such as mobile device 19, may comprise an HMD that identifies a real-world object, acquires a model of the real-world object from a server, determines dimensions of a virtual proxy object based on the model, generates the virtual proxy object based on the dimensions, and then displays the virtual proxy object within an augmented reality environment. In some cases, a first surface of the virtual proxy object may be associated with one or more snapping properties, such that the first surface of the virtual proxy object may automatically snap to a particular object or real-world surface within the augmented reality environment. In one example, the first surface of the virtual proxy object may automatically snap to walls within the augmented reality environment once the first surface comes within a threshold distance of a wall (e.g., within two feet of the wall).

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5. The IMU may include a tri-axial accelerometer, a tri-axial gyro, and a tri-axial magnetic sensor. The mobile device 5 may determine an inertial frame using the IMU. The inertial reference frame may include an x-axis pointing North, a y-axis pointing East, and a z-axis pointing down towards the Earth.

In one embodiment, a mobile device, such as mobile device 5, may be positioned such that an orientation of the mobile device is held fixed (or substantially fixed) relative to the body of an end user of the mobile device. In one example, the mobile device may be positioned within a back pocket of pants or shorts worn by the end user. In another example, the mobile device may be positioned within a front pocket of a shirt or jacket worn by the end user. In another example, the mobile device may be strapped or clipped to a belt worn around the end user's waist. In these cases, an orientation of the mobile device relative to the end user's body may be determined using accelerometer and magnetometer data generated by the mobile device. The mobile device may generate a gravity vector or a vector that is orthogonal to a surface of the Earth based on the accelerometer and magnetometer data. The gravity vector may correspond with a vector that points towards the ground from a point on the mobile device. In one embodiment, an axis of a virtual cylinder may correspond with the gravity vector. The axis may correspond with a line that intersects the mobile device and is parallel to the gravity vector. The mobile device may also generate a North vector or a vector that is orthogonal to the gravity vector and points in a northern direction based on the accelerometer and magnetometer data. In some cases, during a calibration step, the mobile device may determine a front facing vector by asking the end user to face North and align the front of their body with the North vector. The front facing vector may then move relative to a North-East-Down (NED) reference frame generated by the mobile device.

Figure 2B:
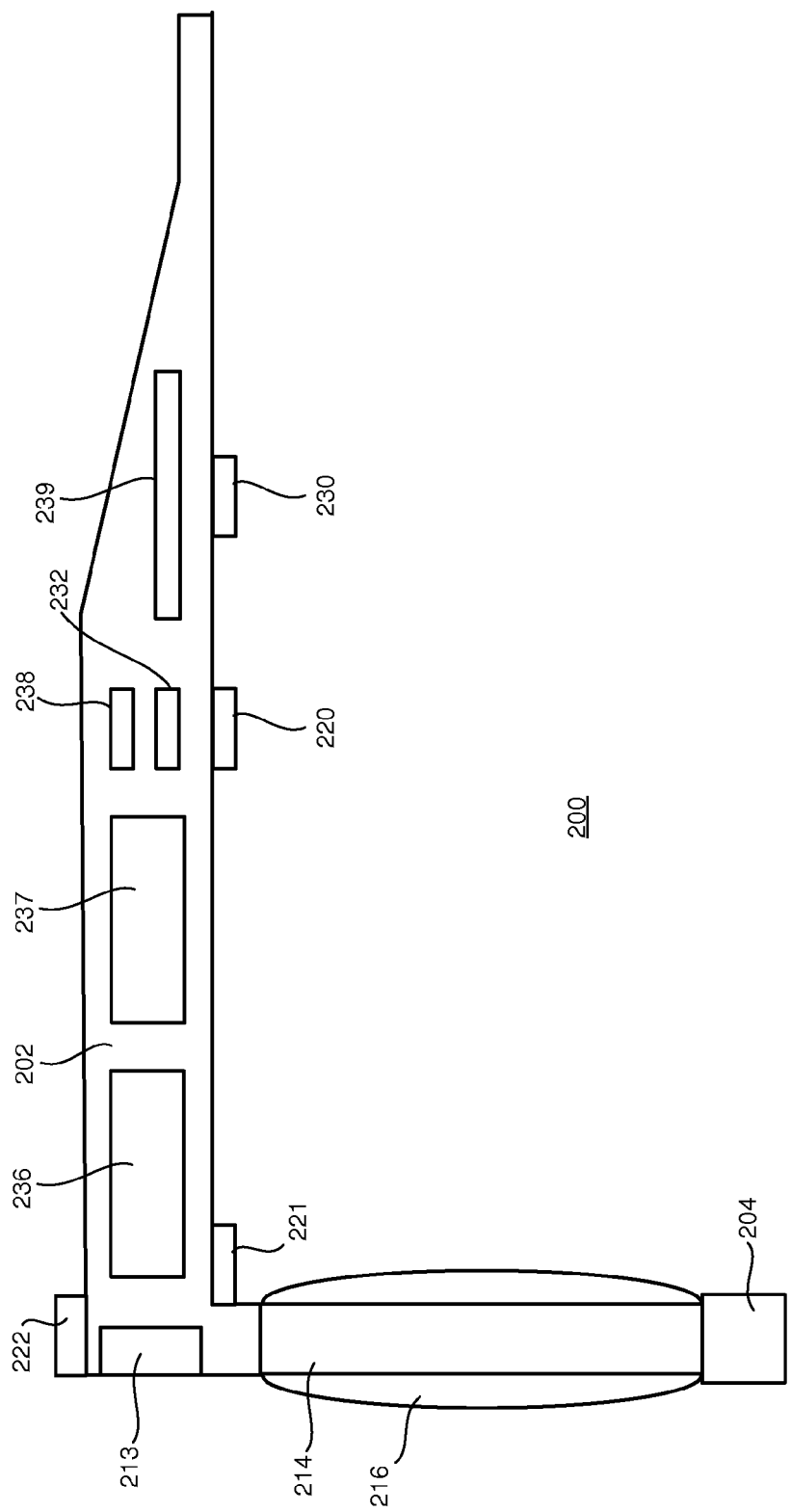
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, body facing camera 222, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. The one or more inward facing cameras may capture images of an eye of an end user of the HMD. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011.

In one embodiment, the body facing camera 222 may include one or more downward facing cameras. The one or more downward facing cameras may capture images of a portion of a body of an end user of the HMD. For example, the one or more downward facing cameras may capture images of the end user's torso, chest, abdomen, or pelvic region. The images of the end user's body may be used to determine an orientation of the end user's body relative to the HMD. In one example, image processing techniques may be applied to the images of the end user's body to determine a direction that the end user's torso is facing relative to the HMD.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
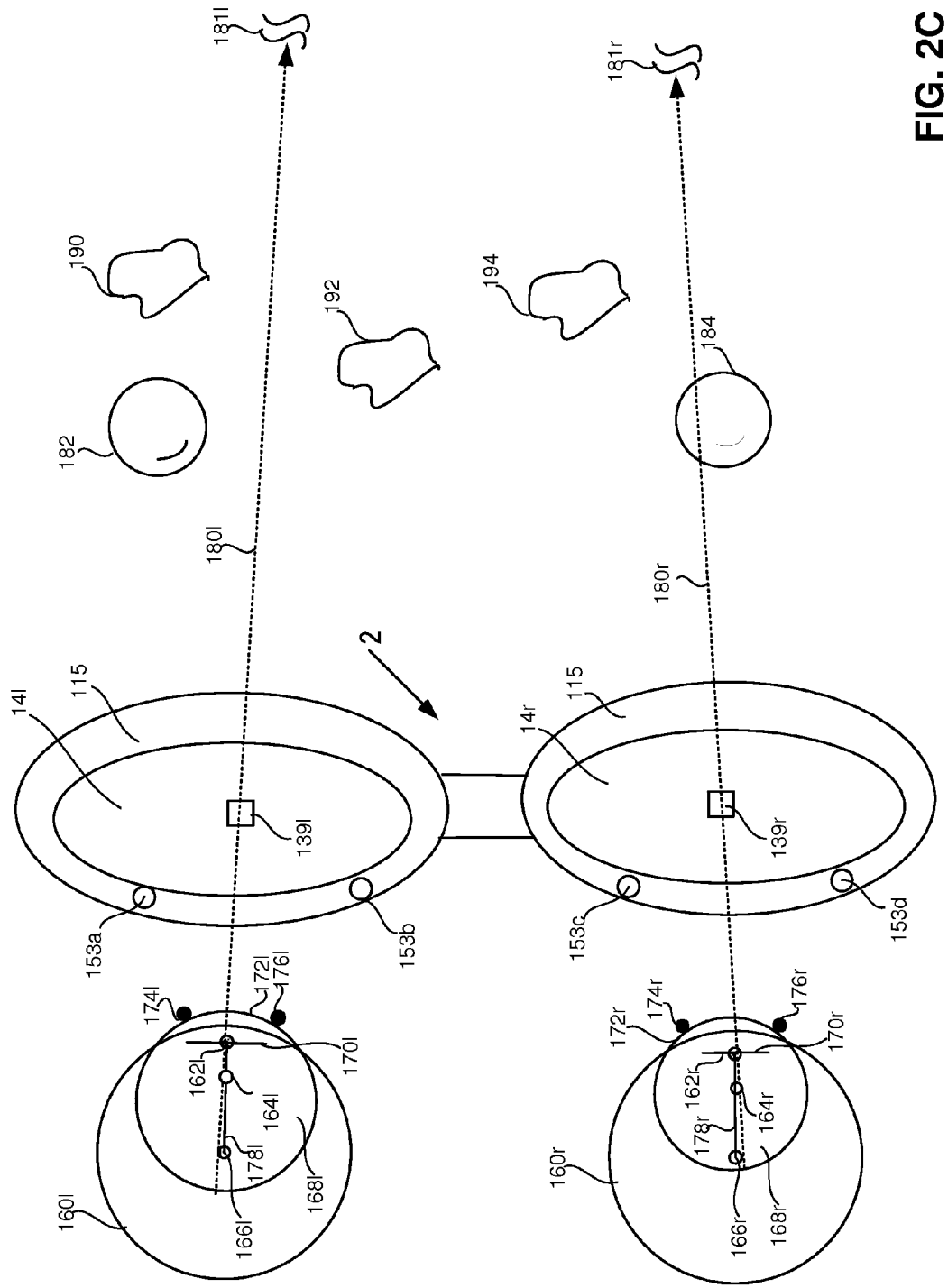
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
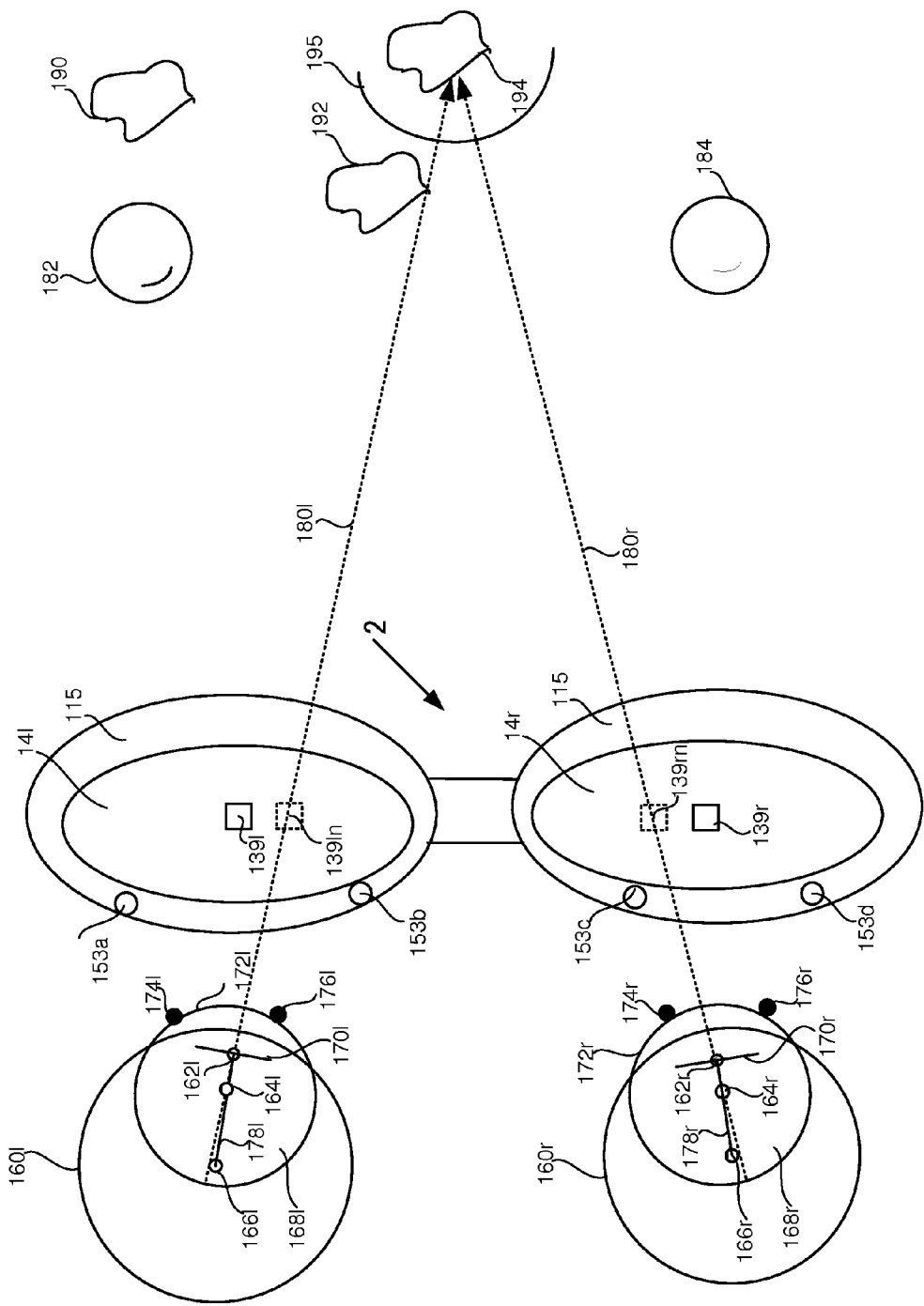
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*. More information about determining the IPD for an end user of an HMD and adjusting the display optical systems accordingly can be found in U.S. patent application Ser. No. 13/250,878, entitled "Personal Audio/Visual System," filed Sep. 30, 2011.

Figure 2E:
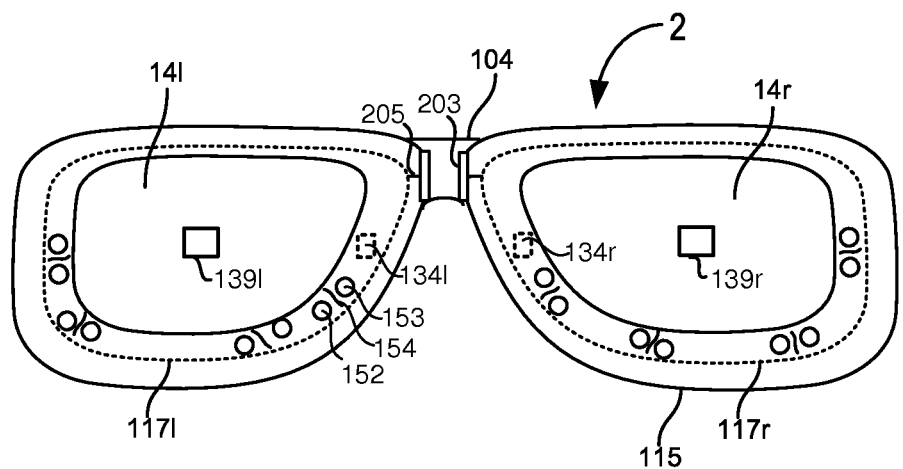
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134l and 134r) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

Each display optical system 14 and its arrangement of gaze detection elements facing each eye (e.g., such as camera 134 and its detection area 139, the illuminators 153, and photodetectors 152) may be located on a movable inner frame portion 117l, 117r. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
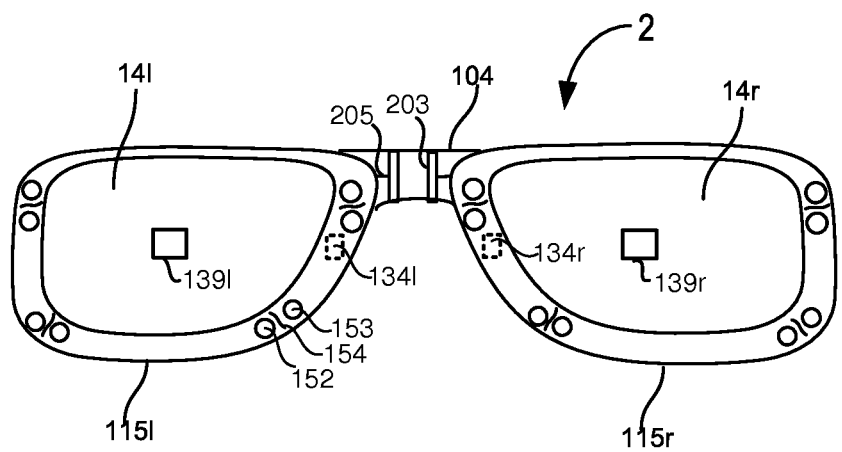
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115l, 115r. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

Figure 3:
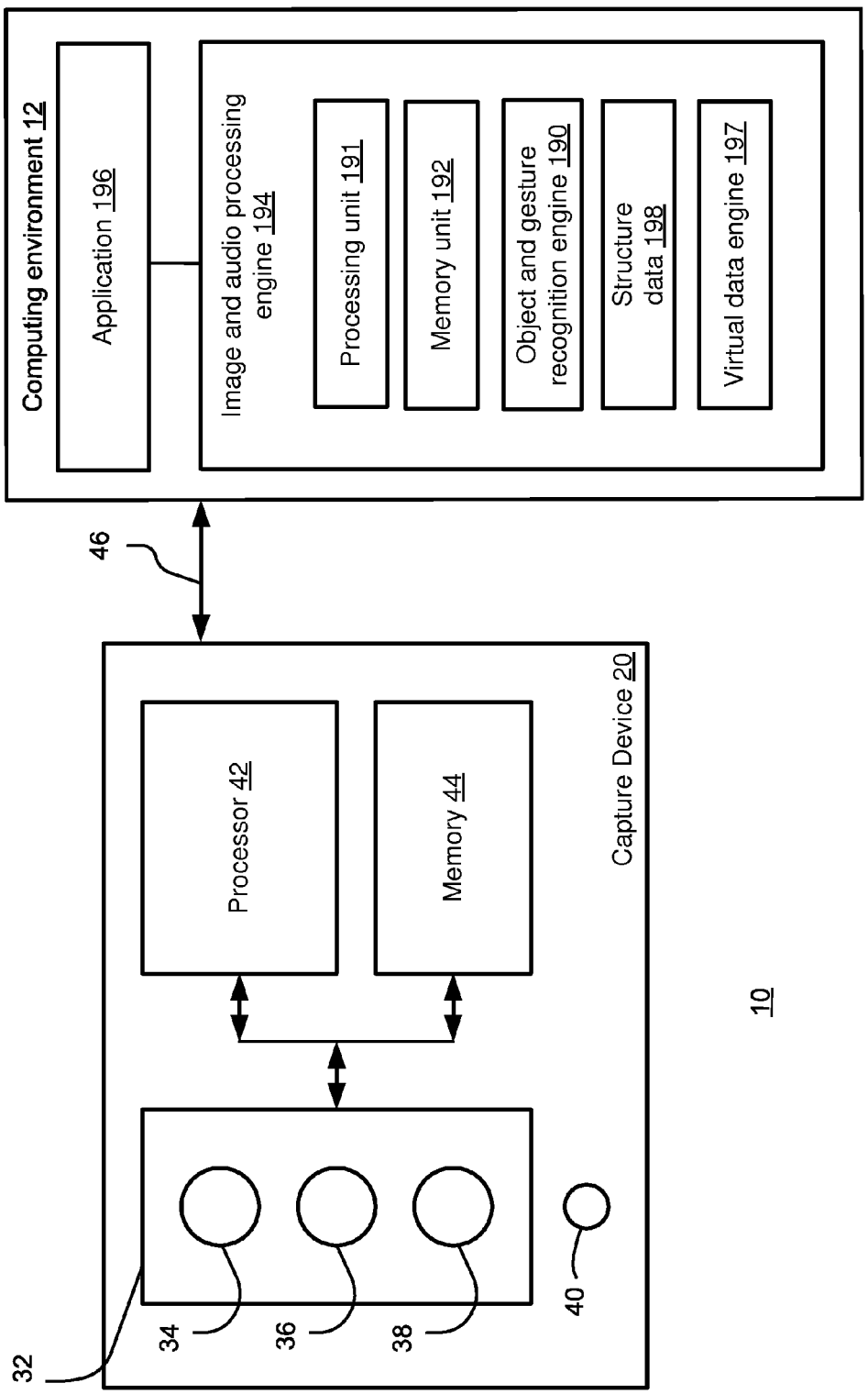
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an image sensor and/or an IR CMOS image sensor. The capture device 20 may include an image camera component 32. The image camera component 32 may include an IR light component 34, a depth camera 36, and an RGB camera 38 that may be used to capture the depth image of a capture area. In one example, the IR light component 34 of the capture device 20 may emit an infrared light into the capture area and may then use sensors to detect the back-scattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred (e.g., end user gestures for controlling or manipulating a virtual object). It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11b, g, a, or n connection. In one embodiment, the capture device 20 may provide the images captured by, for example, the depth camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application, a messaging application, or an application for generating an augmented reality environment. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Virtual data engine 197 processes virtual objects and registers the position and orientation of virtual objects in relation to various maps of a real-world environment stored in memory unit 192. The virtual data engine may also render images associated with virtual objects for display to an end user of computing system 10. In some embodiments, the computing system 10 may use images acquired from the capture device 20 to determine a six degree of freedom (6DOF) pose corresponding with the images relative to a 3D map of an environment. In one example, a 6DOF pose may comprise information associated with the position and orientation of a mobile device (e.g., an HMD) within the environment. The 6DOF pose may be used for localizing a mobile device and to generate images of virtual objects such that the virtual objects appear to exist at appropriate locations within an augmented reality environment. More information regarding determining a 6DOF pose can be found in U.S. patent application Ser. No. 13/152,220, "Distributed Asynchronous Localization and Mapping for Augmented Reality." More information regarding performing pose estimation and/or localization for a mobile device can be found in U.S. patent application Ser. No. 13/017,474, "Mobile Camera Localization Using Depth Maps."

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil or stylus).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10 (e.g., an object selection gesture). In one embodiment, the object and gesture recognition engine 190 may utilize machine learning classification techniques.

Figure 4B:
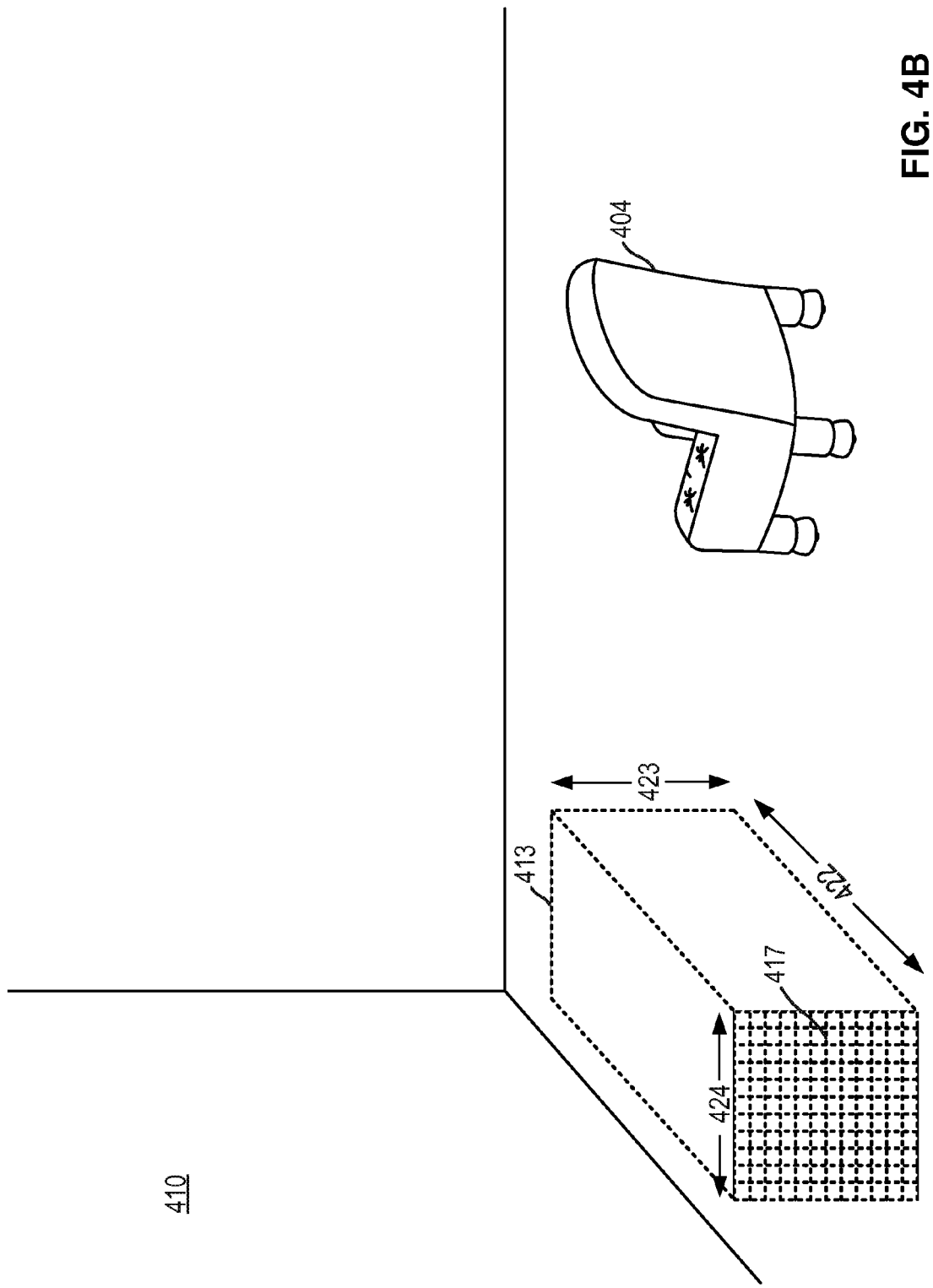
FIG. 4B depicts one embodiment of an augmented reality environment in which a first virtual proxy object has been fitted over a table.

FIGS. 4A-4C depict examples of various environments from which virtual proxy objects may be generated and in which virtual proxy objects may be displayed. FIG. 4A depicts one embodiment of an environment 400 in which one or more real-world objects may be positioned. As depicted, environment 400 comprises a three-dimensional real-world space including a table 403 and a chair 404. In one embodiment, the field of view of an HMD at a particular point in time or the real-world environment captured by the HMD at the particular point in time may correspond with the view depicted in FIG. 4A.

FIG. 4B depicts one embodiment of an augmented reality environment 410 in which a first virtual proxy object 413 has been fitted over the table 403 of FIG. 4A. The first virtual proxy object 413 comprises a three-dimensional object (e.g., a rectangular prism). The first virtual proxy object 413 includes a first edge of length 422 in a first dimension, a second edge of height 423 in a second dimension, and a third edge of width 424 in a third dimension. The first virtual proxy object 413 includes six surfaces. A first surface 417 of the first virtual proxy object 413 may be identified and assigned as a side surface (e.g., a side of the table 403 in FIG. 4A). The first surface 417 may be assigned a snapping property such that the first surface 417 snaps to a real-world wall within an augmented reality environment whenever the first virtual proxy object 413 is located within a threshold distance of the wall. In one example, the first virtual proxy object 413 may orient and snap to a wall if the first surface 417 is within two feet of the wall. In another example, a bottom surface of the first virtual proxy object 413 may be identified as the bottom of the table 403 in FIG. 4A based on an orientation of the table 403 and assigned a snapping property such that the bottom surface of the first virtual proxy object 413 snaps to a floor if the bottom surface of the first virtual proxy object 413 is within six inches of the floor.

In one embodiment, the first edge, the second edge, and the third edge of the first virtual proxy object 413 may be determined by an HMD based on boundary points associated with the table 403 in FIG. 4A. In one example, the first edge of length 422 may be determined based on a maximum distance between points corresponding with the table 403 in the first dimension. The maximum distance between points corresponding with the table 403 may be determined by applying image processing techniques, such as segmentation and object recognition, to color and/or depth images acquired using the HMD. Similarly, the second edge of height 423 may be determined by processing color and/or depth images captured using the HMD and determining the maximum distance between points corresponding with the table 403 in the second dimension. The third edge of width 424 may be determined by determining the maximum distance between points corresponding with the table 403 in the third dimension.

FIG. 4C depicts one embodiment of an augmented reality environment 410 in which a second virtual proxy object 414 has been fitted over the chair 404 of FIG. 4A. The second virtual proxy object 414 comprises a three-dimensional object (e.g., a cube). The second virtual proxy object 414 includes six surfaces and eight points in space. A second surface 432 of the second virtual proxy object 414 may be identified and assigned as a side surface (e.g., a backside of the chair 404 in FIG. 4A). The second surface 432 may be assigned a snapping property such that the second surface 432 snaps to a real-world wall within an augmented reality environment whenever the second virtual proxy object 414 is located within a threshold distance of the wall. In one example, the second virtual proxy object 414 may orient and snap to a wall if the second surface 432 is within six inches of the wall. In another example, a bottom surface of the second virtual proxy object 414 may be identified as the bottom of the chair 404 in FIG. 4A based on an orientation of the chair 404 and assigned a snapping property such that the bottom surface of the second virtual proxy object 414 snaps to a floor if the bottom surface of the second virtual proxy object 414 is within one meter of the floor.

In one embodiment, the dimensions of the second virtual proxy object 414 may be determined by finding a size of the second virtual proxy object 414 that best approximates the size of the chair 404 in FIG. 4A. In some cases, the dimensions of the second virtual proxy object 414 may be determined based on the minimum size of the second virtual proxy object 414 that completely covers the chair 404 in FIG. 4A.

After the first virtual proxy object 413 and the second virtual proxy object 414 have been generated, they may be positioned within different augmented reality environments by an end user of an HMD. In one example, the first virtual proxy object 413 and the second virtual proxy object 414 may be generated based on color and/or depth images acquired within a furniture store and then positioned and repositioned within an augmented reality environment associated with a living room by the end user of the HMD. In this case, the end user of the HMD may visualize how the living room would look if the living room included the table 403 and the chair 404 in FIG. 4A.

Figure 5A:
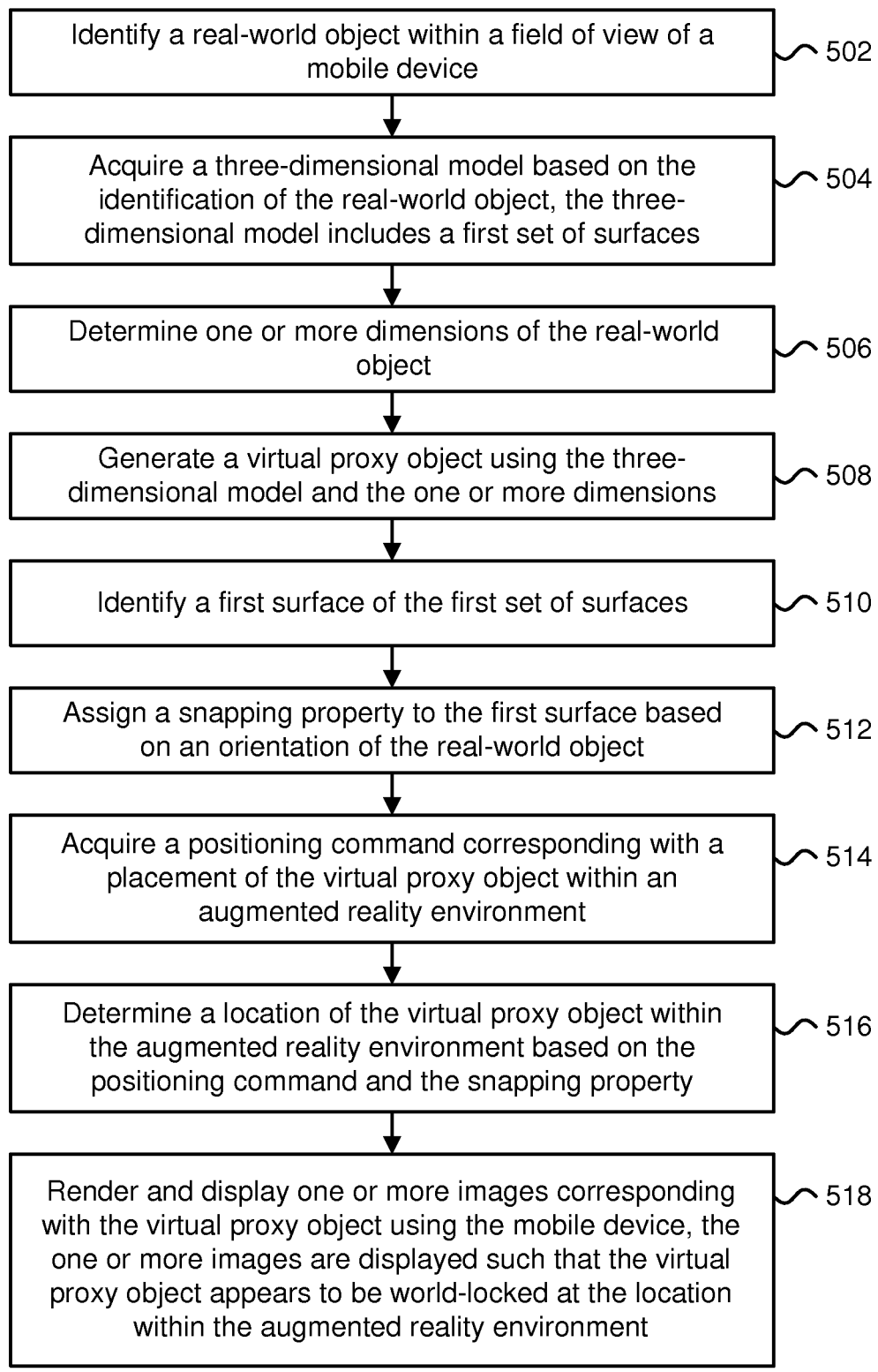
FIG. 5A is a flowchart describing one embodiment of a method for generating and displaying a virtual proxy object.

FIG. 5A is a flowchart describing one embodiment of a method for generating and displaying a virtual proxy object. In one embodiment, the process of FIG. 5A may be performed by a mobile device, such as mobile device 19 in FIG. 1.

In step 502, a real-world object is identified within a field of view of a mobile device. The mobile device may comprise an HMD. The real-world object may be identified by an end user of the HMD using a hand gesture to identify the real-world object. In step 504, a three-dimensional model is acquired based on the identification of the real-world object. In one embodiment, the three-dimensional model may be acquired from a server, such as server 15 in FIG. 1. The three-dimensional model may include a first set of surfaces. The three-dimensional model may comprise, for example, a three-dimensional shape with six surfaces. The three-dimensional model may comprise a rectangular prism, a cube, a triangular prism, a square pyramid, a cylinder, a cone, or a sphere.

In step 506, one or more dimensions of the real-world object are determined. In one embodiment, the one or more dimensions may be determined using an HMD in which the HMD determines a first maximum span of the real-world object within a first dimension and a second maximum span of the real-world object within a second dimension perpendicular to the first dimension. The one or more dimensions of the real-world object may be determined using color and/or depth images captured by the HMD. For example, the color and/or depth images may be used to determine the first maximum span of the real-world object in the first dimension and the second maximum span of the real-world object in the second dimension. In another embodiment, the one or more dimensions may be determined by downloading the one or more dimensions from a server based on the identification of the real-world object. In some cases, the real-world object may be identified based on an AR tag attached to the real-world object. In other cases, the real-world object may be identified using object recognition to classify the real-world object as a particular object (e.g., that the real-world object is a chair or table).

In step 508, a virtual proxy object is generated using the three-dimensional model and the one or more dimensions. The virtual proxy object may be generated by scaling the three-dimensional model to the one or more dimensions. In step 510, a first surface of the three-dimensional model is identified. The first surface may be identified based on an orientation of the real-world object identified in step 502. In one example, the first surface may comprise a bottom surface that is oriented towards the ground. In another example, the first surface may comprise a side surface associated with a side of the real-world object (e.g., a side of a table or chair). In step 512, a snapping property is assigned to the first surface based on an orientation of the real-world object. In one example, if the first surface corresponds with a side surface, then the snapping property may force the first surface to snap to a vertical wall within an augmented reality environment if the first surface comes within a threshold distance of the vertical wall. In another example, if the first surface corresponds with a bottom surface, then the snapping property may force the first surface to snap to a horizontal surface within an augmented reality environment if the first surface comes within a threshold distance of the horizontal surface (e.g., a tabletop or floor). In some cases, the snapping property may force the first surface to snap to an angled surface within the augmented reality environment (e.g., an angled wall). The angled surface may comprise a surface with an orientation that is neither vertical nor horizontal within the augmented reality environment.

In step 514, a positioning command corresponding with a placement of the virtual proxy object within an augmented reality environment is acquired. In one embodiment, the positioning command may comprise a voice command issued by an end user of the mobile device. In another embodiment, the positioning command may comprise a hand gesture performed by the end user of the mobile device. In step 516, a location of the virtual proxy object within the augmented reality environment is determined based on the positioning command and the snapping property. In step 518, one or more images corresponding with the virtual proxy object are rendered and displayed using the mobile device. The one or more images may be displayed using an HMD such that the virtual proxy object appears to be world-locked at the location within the augmented reality environment.

Figure 5B:
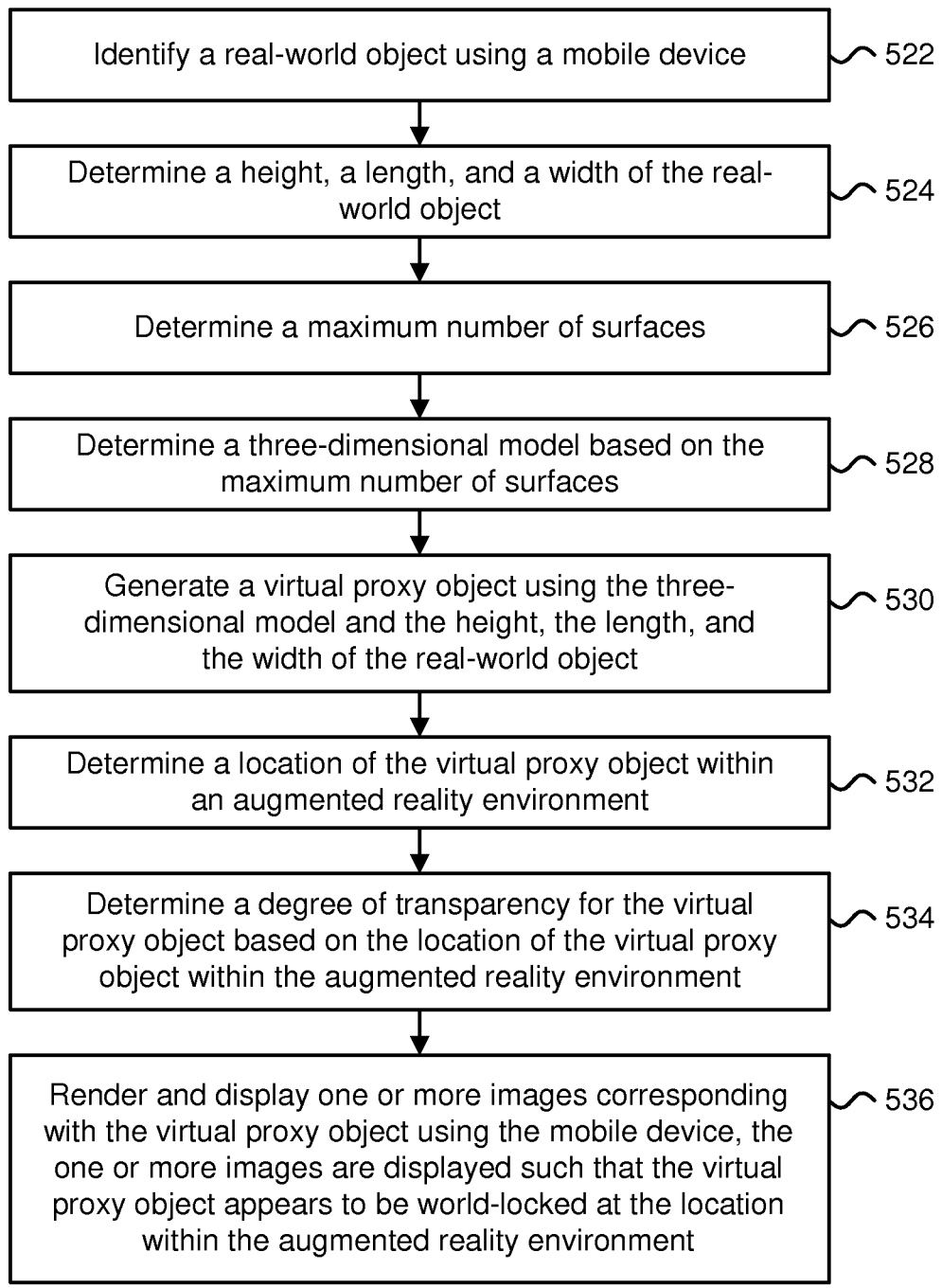
FIG. 5B is a flowchart describing an alternative embodiment of a method for generating and displaying a virtual proxy object.

FIG. 5B is a flowchart describing an alternative embodiment of a method for generating and displaying a virtual proxy object. In one embodiment, the process of FIG. 5B may be performed by a mobile device, such as mobile device 19 in FIG. 1.

In step 522, a real-world object is identified using a mobile device. The mobile device may comprise an HMD. The real-world object may comprise, for example, a chair, a table, a couch, a piece of furniture, a painting, or a picture frame. In step 524, a height, a length, and a width of the real-world object is determined. In one embodiment, the height, the length, and the width of the real-world object may be determined by applying object recognition techniques, edge detection techniques, feature detection techniques, and segmentation techniques to color and/or depth images captured using the mobile device. In one example, the height may be determined by determining a maximum distance between two points associated with the real-world object within a first dimension that is perpendicular to the ground. In another example, the width of the real-world object may be determined by determining a maximum distance between two points associated with the real-world object within a second dimension that is parallel to the ground. The length of the real-world object may be determined by determining a maximum distance between two points of the real-world object within a third dimension that is orthogonal to the second dimension and orthogonal to the first dimension.

In some cases, the height and the width of the real-world object may be determined using an HMD in which the HMD applies image processing techniques to color and/or depth images to determine a first maximum span of the real-world object within a first dimension that is parallel to the ground and a second maximum span of the real-world object within a second dimension that is orthogonal to the ground. The first maximum span of the real-world object within the first dimension may comprise the width and the second maximum span of the real-world object within the second dimension may comprise the height.

In step 526, a maximum number of surfaces is determined. In some cases, the maximum number of surfaces may be set by an end user of the mobile device. In step 528, a three-dimensional model is determined based on the maximum number of surfaces. In one example, if the maximum number of surfaces comprises six surfaces, then the three-dimensional model may comprise a rectangular prism. In another example, if the maximum number of surfaces comprises eight surfaces, then the three-dimensional model may comprise a hexagonal prism.

In step 530, a virtual proxy object is generated using the three-dimensional model and the height, the length, and the width of the real-world object determined in step 524. The virtual proxy object may comprise a virtual object in which the three-dimensional model has been scaled to the height, the length, and the width of the real-world object. In step 532, a location of the virtual proxy object is determined within an augmented reality environment. In one embodiment, the location of the virtual proxy object may be determined based on a positioning command provided by an end user of the mobile device. The positioning command may be provided using a voice command or a hand gesture.

In step 534, a degree of transparency for the virtual proxy object is determined based on the location of the virtual proxy object within the augmented reality environment. In one embodiment, the virtual proxy object may utilize a ghost-mode such that the virtual proxy object appears opaque whenever the virtual proxy object does not interact with a real-world object within the augmented reality environment and appears translucent or transparent whenever the virtual proxy object interacts with or overlaps a real-world object within the augmented reality environment. In another embodiment, the virtual proxy object may become partially transparent if the virtual proxy object would occlude a real-world object within the augmented reality environment as viewed by an end user of an HMD. In step 536, one or more images corresponding with the virtual proxy object are rendered and displayed using the mobile device. The one or more images are displayed such that the virtual proxy object appears to be world-locked at the location within the augmented reality environment. In this case, as an end user of an HMD turns their head or moves within the augmented reality environment, the one or more images displayed to the end user on the HMD may change such that the virtual proxy object appears to exist within the augmented reality environment at the location.

One embodiment of the disclosed technology includes one or more processors in communication with a see-through display. The one or more processors identify a real-world object and acquire a three-dimensional model based on the identification of the real-world object. The one or more processors determine a first maximum span of the real-world object in a first dimension and determine a second maximum span of the real-world object in a second dimension that is orthogonal to the first dimension. The one or more processors generate the virtual proxy object by scaling the three-dimensional model based on the first maximum span and the second maximum span. The one or more processors determine a location of the virtual proxy object within the augmented reality environment and render one or more images corresponding with the virtual proxy object. The see-through display displays the one or more images such that the virtual proxy object appears to be world-locked at the location within the augmented reality environment.

One embodiment of the disclosed technology includes a method for generating and controlling a virtual proxy object within an augmented reality environment using a mobile device including identifying a real-world object within a field of view of the mobile device, acquiring a three-dimensional model based on the identification of the real-world object, and determining one or more dimensions of the real-world object. The determining one or more dimensions includes determining a first maximum span of the real-world object in a first dimension and determining a second maximum span of the real-world object in a second dimension that is orthogonal to the first dimension. The method further comprises generating the virtual proxy object using the three-dimensional model and the one or more dimensions, determining a location of the virtual proxy object within the augmented reality environment, and displaying one or more images corresponding with the virtual proxy object using the mobile device. The one or more images are displayed such that the virtual proxy object appears to be world-locked at the location within the augmented reality environment.

One embodiment of the disclosed technology includes acquiring a three-dimensional model associated with a real-world object and determining one or more dimensions of the real-world object. The determining one or more dimensions includes determining a first maximum span of the real-world object in a first dimension and determining a second maximum span of the real-world object in a second dimension that is orthogonal to the first dimension. The method further comprises generating the virtual proxy object using the three-dimensional model and the one or more dimensions, determining a location of the virtual proxy object within an augmented reality environment, detecting that the virtual proxy object occludes an object within a field of view of a head-mounted display device based on the location of the virtual proxy object within the augmented reality environment, determining that the virtual proxy object should be made partially transparent in response to the detecting that the virtual proxy object occludes the object within the field of view of the head-mounted display device, and displaying one or more images corresponding with the virtual proxy object using the head-mounted display device. The one or more images are displayed such that the virtual proxy object appears to be world-locked at the location within the augmented reality environment and such that the virtual proxy object appears to be partially transparent.

Figure 6:
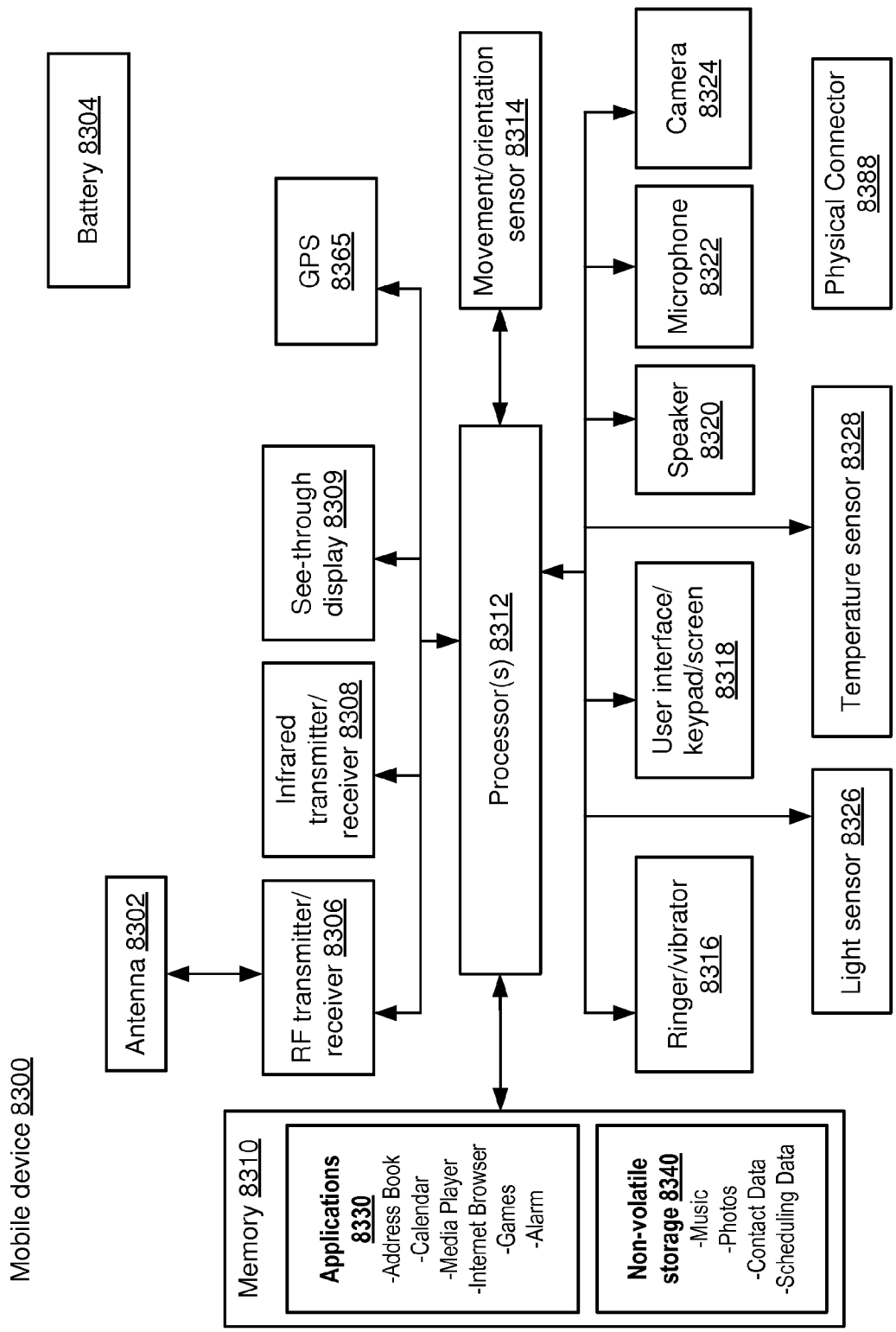
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

For purposes of this document, reference in the specification to "an embodiment," "one embodiment," "some embodiments," or "another embodiment" may be used to describe different embodiments and do not necessarily refer to the same embodiment.

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for generating and controlling a virtual proxy object within an augmented reality environment, comprising:
one or more processors configured to identify a real-world object and acquire a three-dimensional model based on the identification of the real-world object, the one or more processors configured to determine a first maximum span of the real-world object in a first dimension and determine a second maximum span of the real-world object in a second dimension that is orthogonal to the first dimension, the one or more processors configured to generate the virtual proxy object by scaling the three-dimensional model based on the first maximum span and the second maximum span, the one or more processors configured to determine a location of the virtual proxy object within the augmented reality environment and render one or more images corresponding with the virtual proxy object, the one or more processors configured to identify a first surface of the virtual proxy object and assign a first snapping property to the first surface based on an orientation of the real-world object, the first snapping property causes the first surface of the virtual proxy object to snap to a horizontal surface within the augmented reality environment if the first surface is within a first threshold distance of the horizontal surface, the one or more processors configured to identify a second surface of the virtual proxy object and assign a second snapping property to the second surface based on the orientation of the real-world object, the second snapping property causes the second surface of the virtual proxy object to snap to a vertical surface different from the horizontal surface within the augmented reality environment if the second surface is within a second threshold distance of the vertical surface; and
a see-through display in communication with the one or more processors, the see-through display configured to display the one or more images such that the virtual proxy object appears to be world-locked at the location within the augmented reality environment.

2. The electronic device of claim 1, wherein:
the one or more processors configured to determine a snap grid spacing for a snap grid within the augmented reality environment based on a number of surfaces for the virtual proxy object.

3. The electronic device of claim 1, wherein:
the first surface comprises a bottom surface of the virtual proxy object and the horizontal surface comprises a floor.

4. The electronic device of claim 2, wherein:
the one or more processors configured to determine a snap grid spacing for a snap grid within the augmented reality environment based on the number of surfaces for the virtual proxy object and a size of the virtual proxy object.

5. The electronic device of claim 1, wherein:
the first surface comprises a bottom surface of the virtual proxy object and the horizontal surface comprises a floor within the augmented reality environment; and
the second surface comprises a side surface of the virtual proxy model and the vertical surface comprises a wall within the augmented reality environment.

6. The electronic device of claim 1, wherein:
the one or more processors configured to acquire one or more depth images of the real-world object and determine a height, a length, and a width of the real-world object using the one or more depth images; and
the one or more processors configured to generate the virtual proxy object using the three-dimensional model and the height, the length, and the width of the real-world object.

7. The electronic device of claim 1, wherein:
the one or more processors configured to determine whether the virtual proxy object should be made partially transparent based on the location of the virtual proxy object within the augmented reality environment; and
the see-through display configured to display the one or more images such that the virtual proxy object appears to be partially transparent.

8. The electronic device of claim 1, wherein:
the three-dimensional model comprises a rectangular prism; and
the electronic device comprises a head-mounted display device.

9. A method for generating and controlling a virtual proxy object within an augmented reality environment using a mobile device, comprising:
identifying a real-world object within a field of view of the mobile device;
acquiring a three-dimensional model for the real-world object based on the identification of the real-world object;
determining one or more dimensions of the real-world object, the determining one or more dimensions includes determining a first maximum span of the real-world object in a first dimension and determining a second maximum span of the real-world object in a second dimension that is orthogonal to the first dimension;
assigning a first snapping property to a first surface of the virtual proxy object based on an orientation of the real-world object, the first snapping property causes the first surface of the virtual proxy object to snap to a horizontal surface within the augmented reality environment if the first surface is within a first threshold distance of the horizontal surface;
assigning a second snapping property to a second surface of the virtual proxy object based on the orientation of the real-world object, the second snapping property causes the second surface of the virtual proxy object to snap to a vertical surface different from the horizontal surface within the augmented reality environment if the second surface is within a second threshold distance of the vertical surface;
generating the virtual proxy object using the three-dimensional model and the one or more dimensions;
detecting that the second surface of the virtual proxy object is within the second threshold distance of the vertical surface;
determining a location of the virtual proxy object within the augmented reality environment in response to detecting that the second surface of the virtual proxy object is within the second threshold distance of the vertical surface; and
displaying one or more images corresponding with the virtual proxy object using the mobile device, the one or more images are displayed such that the virtual proxy object appears to be world-locked at the location within the augmented reality environment.

10. The method of claim 9, further comprising:
determining a snap grid spacing for a snap grid within the augmented reality environment based on a number of surfaces for the virtual proxy object.

11. The method of claim 10, wherein:
the first surface comprises a bottom surface of the virtual proxy object and the horizontal surface comprises a floor.

12. The method of claim 9, further comprising:
determining a snap grid spacing for a snap grid within the augmented reality environment based on a number of surfaces for the virtual proxy object and a size of the virtual proxy object.

13. The method of claim 12, wherein:
the first surface comprises a side surface of the virtual proxy model and the vertical surface comprises a wall.

14. The method of claim 9, wherein:
the determining one or more dimensions includes determining a height, a length, and a width of the real-world object; and
the generating the virtual proxy object includes generating the virtual proxy object using the three-dimensional model and the height, the length, and the width of the real-world object.

15. The method of claim 9, further comprising:
determining whether the virtual proxy object should be made partially transparent based on the location of the virtual proxy object within the augmented reality environment; and
the displaying one or more images includes displaying the one or more images such that the virtual proxy object appears to be partially transparent.

16. The method of claim 9, wherein:
the determining one or more dimensions includes determining a minimum size of the three-dimensional model that completely covers the real-world object.

17. The method of claim 9, wherein:
the three-dimensional model comprises at most six surfaces.

18. The method of claim 9, wherein:
the three-dimensional model comprises a rectangular prism.

19. The method of claim 9, wherein:
the mobile device comprises a head-mounted display device.

20. One or more storage devices containing processor readable code for programming one or more processors to perform a method for generating and controlling a virtual proxy object within an augmented reality environment using a head-mounted display device comprising the steps of:
acquiring a three-dimensional model associated with a real-world object;
determining one or more dimensions of the real-world object, the determining one or more dimensions includes determining a first maximum span of the real-world object in a first dimension and determining a second maximum span of the real-world object in a second dimension that is orthogonal to the first dimension;
assigning a first snapping property to a first surface of the virtual proxy object based on an orientation of the real-world object, the first snapping property causes the first surface of the virtual proxy object to snap to a horizontal surface within the augmented reality environment if the first surface is within a first threshold distance of the horizontal surface;
assigning a second snapping property to a second surface of the virtual proxy object based on the orientation of the real-world object, the second snapping property causes the second surface of the virtual proxy object to snap to a vertical surface different from the horizontal surface within the augmented reality environment if the second surface is within a second threshold distance of the vertical surface;
generating the virtual proxy object using the three-dimensional model and the one or more dimensions;
detecting that the second surface of the virtual proxy object is within the second threshold distance of the vertical surface;
determining a location of the virtual proxy object within the augmented reality environment in response to detecting that the second surface of the virtual proxy object is within the second threshold distance of the vertical surface; and
displaying one or more images corresponding with the virtual proxy object using the head-mounted display device, the one or more images are displayed such that the virtual proxy object appears to be world-locked at the location within the augmented reality environment.

* * * * *